United States Patent
Joung et al.

(10) Patent No.: US 7,034,891 B2
(45) Date of Patent: Apr. 25, 2006

(54) INTERFACING SYSTEM FOR STREAM SOURCE APPARATUS AND DISPLAY APPARATUS AND INTERFACING METHOD THEREOF

(75) Inventors: Chul Yong Joung, Seoul (KR); Yong Ho Cho, Sungnam (KR); Nam Seok Cho, Ohsan (KR)

(73) Assignee: LG Electronics Inc., Seoul (KR)

( * ) Notice: Subject to any disclaimer, the term of this patent is extended or adjusted under 35 U.S.C. 154(b) by 596 days.

(21) Appl. No.: 10/355,027

(22) Filed: Jan. 31, 2003

(65) Prior Publication Data

US 2003/0147010 A1 Aug. 7, 2003

(30) Foreign Application Priority Data

Feb. 1, 2002 (KR) ............... 10-2002-0005940

(51) Int. Cl.
*H04N 5/45* (2006.01)
*H04N 9/74* (2006.01)

(52) U.S. Cl. ............... 348/565; 348/567; 348/584; 348/598; 348/734

(58) Field of Classification Search ........ 348/563–565, 348/567, 568, 584, 588, 598, 734; 725/37, 725/131, 139, 151; H04N 5/45, 9/74
See application file for complete search history.

(56) References Cited

U.S. PATENT DOCUMENTS 5,657,092 A    8/1997  Kim
6,181,334 B1 *  1/2001  Freeman et al. ............ 725/138

2001/0021998 A1   9/2001  Margulis

FOREIGN PATENT DOCUMENTS

EP          99/35831 A    7/1999

OTHER PUBLICATIONS

Patent Abstracts of Japan, vol. 015, No. 494 (E-1145), Dec. 13, 1991.
Database WPI, Week 9844, Derwent Publications Ltd., London, GB, AN 1998-513416, XP002252596, "Character Information Forwarding System".

* cited by examiner

*Primary Examiner*—Sherrie Hsia
(74) *Attorney, Agent, or Firm*—Birch, Stewart, Kolasch & Birch, LLP

(57) ABSTRACT

An interfacing method and system for a stream source apparatus and a display device, which includes a stream source apparatus receiving analog/digital signals from external analog/digital equipments to generate a plurality of transmission packet streams corresponding to the analog/digital signals, the stream source apparatus synthesizing a plurality of the transmission packet streams into a single synthesized transmission packet stream to transmit the synthesized transmission packet stream by wireless, a display apparatus receiving the synthesized transmission packet stream transmitted from the stream source apparatus, the display apparatus separating the synthesized transmission packet stream into a transmission packet stream corresponding to a main screen and a transmission packet stream corresponding to a sub-screen, the display apparatus decoding the transmission packet streams corresponding to the main screen and the sub-screen respectively to generate digital video/audio signals to display on a display screen by a PIP form.

17 Claims, 4 Drawing Sheets

INTERFACING SYSTEM FOR STREAM SOURCE APPARATUS AND DISPLAY APPARATUS AND INTERFACING METHOD THEREOF

This application claims the benefit of the Korean Patent Application No. P2002-05940 filed on Feb. 1, 2002, which is hereby incorporated by reference.

BACKGROUND OF THE INVENTION

1. Field of the Invention

The present invention relates to an interfacing system for stream source apparatus and display apparatus and an interfacing method thereof which have the stream source apparatus synthesize to transform a plurality of transmission packet streams into a single synthesized transmission packet stream form to transmit by wireless and have the display apparatus receive the synthesized transmission packet stream to display on a screen as a PIP (picture in picture) form.

2. Description of the Related Art

Recent electronic technology developments contribute to the developments of various flat panels display (FPD) devices. In a display device such as a TV screen and a monitor, the flat panel display device replaces a cathode ray tube due to its features and advantages of lightweight, thin design, and the like to employ as a display screen for representing a predetermined image.

A plasma display panel (PDP) using photo-luminescence (PL) as a florescent material, a field emission display device (FED) using cathode luminescence (CL), a liquid crystal display device (LCD), an organic electroluminescent display device, and the like are employed as flat panel display devices in various fields.

In such flat panel display devices, the PDP has such features and advantages as high brightness, high luminescence ratio, low unit cost of production, excellent characteristics of heat & cold resistance, feasibility of full color implementation, and lightweight. Hence, the PDP is equipped with a large size screen and is widely used as a display screen for a display device for TV set, computer monitor, or the like.

Moreover, the display device used as the display screen of the PDP has the feature and advantage of thin design and lightweight, thereby being under development for a wall TV.

The display device using the PDP receives video and audio signals from a stream source apparatus such as a set-top box to output video and audio. For this purpose, the display and stream source device according to the related art are constructed to transmit/receive the video and audio signals of the stream source apparatus through a wire as well as transmit/receive a predetermined control signal through the wire.

FIG. 1 illustrates a diagram of an interfacing system for stream source device and display device according to a related art.

Referring to FIG. 1, an interfacing system for a stream source device and a display device, like a wall monitor or a wall TV, includes a wall display device 10 using a PDP as a display screen, a digital unit 20 outputting a transmission packet stream corresponding to digital video and audio signals by playing a predetermined play media such as a digital VTR (video tape recorder), a DVD (digital versatile disc) player, or the like, an analog unit 30 outputting analog video and audio signals like a VTR, a computer system, or the like by playing a play media such as video tape or the like, and a stream source device 40 receiving a digital broadcast signal as well as the transmission packet stream outputted from the digital unit 20 and the analog video and audio signals outputted from the analog unit 30 to switch selectively like a set-top box, the stream source device 40 transmitting the switched signals to the display device 10.

In the interfacing system, the digital unit 20 is connected to the source stream source device 40 through a wire such as IEEE 1394 cable.

The interfacing system for the above-constructed display and stream source device according to a related art is explained in detail as follows.

First of all, the digital unit 20 formats the digital video and audio signals attained by playing the predetermined play media into the transmission packet stream to output, and the outputted transmission packet stream is transmitted to the stream device 40 through the wire such as IEEE 1394 cable.

Meanwhile, the analog unit 30 plays the predetermined play media to generate the analog video and audio signals, and then transmits the generated analog video signals such as R/G/B signals and the analog audio signals to the stream source device 40 through the wire. In this case, the analog unit 30 is connected to the stream source device 40 through an exclusive cable.

The stream source device 40 directly receives the digital broadcast signal through a built-in ATSC tuner or the like. In this case, the received digital broadcast signal includes the transmission packet stream corresponding to the digital video and audio signals.

Moreover, the stream source device 40 transforms the transmission packet stream inputted from the digital unit 20 into the analog video and audio signals, switches the transformed analog video and audio signals or the inputted analog video and audio signals transmitted from the analog unit 30 selectively, and transmits the switched analog video and audio signals to the display device 10.

In this case, the stream source device 40 transmits the analog R/G/B signals and audio signals of L and R channels to the display device 10 through the respective cables or a single exclusive cable.

However, connected to the various units through the wire(s), the display device 10 requires a plurality of input terminals.

Moreover, when the display device 10 connected to the stream source device 40 through the predetermined cable is hung on a wall, the cable is exposed between the display device 10 and the stream source device 40 to defile the appearance of installation.

Recently, in order to overcome the above-explained problems, apparatuses for connecting the display device 10 to the stream source apparatus are under development.

In this case, the stream source device 40 compresses various video/audio signals into a transmission packet stream form to transmit by wireless, and the display device 10 receives to process the transmitted transmission packet stream. And, a predetermined control signal and a predetermined response signal can be transmitted by wireless between the display and stream source device 10 and 40.

However, transmitting the transmission packet stream corresponding to a predetermined video/audio signal by wireless, the stream source device 40 enables to transmit the transmission packet stream corresponding to a single video/audio signal only.

Even if the display device 10 is equipped with a PIP function, the stream source device 40 enables to the transmission packet stream corresponding to the single video/audio signal only. Hence, the display device 10 is unable to perform the PIP function, whereby a user fails to watch at least two images on the screen.

SUMMARY OF THE INVENTION

Accordingly, the present invention is directed to an interfacing system for stream source apparatus and display apparatus and an interfacing method thereof that substantially obviate one or more problems due to limitations and disadvantages of the related art.

An object of the present invention is to provide a stream source apparatus synthesizing to transform a plurality of transmission packet stream into a single synthesized transmission packet stream form to transmit a display apparatus by wireless.

Another object of the present invention is to provide a display apparatus which receives to separate the transmission packet stream, which is synthesized and transmitted by wireless from the stream source apparatus, into a plurality of transmission packet streams and processes a plurality of the transmission packet streams with PIP to display on a screen.

A further object of the present invention is to provide an interfacing method for stream source apparatus and display apparatus enabling to have the stream source apparatus carry out a corresponding operation according to a remote control signal by having the display apparatus receive the remote control signal by a user's operation of a remote controller and having the display apparatus transmit the received remote control signal to the stream source apparatus by wireless.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an interfacing system for a stream source apparatus and a display apparatus according to the present invention includes a stream source apparatus receiving analog/digital signals from external analog/digital equipments to generate a plurality of transmission packet streams corresponding to the analog/digital signals, the stream source apparatus synthesizing a plurality of the transmission packet streams into a single synthesized transmission packet stream to transmit the synthesized transmission packet stream by wireless and a display apparatus receiving the synthesized transmission packet stream transmitted from the stream source apparatus, the display apparatus separating the synthesized transmission packet stream into a transmission packet stream corresponding to a main screen and a transmission packet stream corresponding to a sub-screen, the display apparatus decoding the transmission packet streams corresponding to the main screen and the sub-screen respectively to generate digital video/audio signals to display on a display screen by a PIP form.

Preferably, the stream source apparatus includes a transmission packet stream generating unit receiving the analog/digital signals from the external analog/digital equipments to generate a plurality of the transmission packet streams, a digital switching unit selecting a plurality of the transmission packet streams to be multiplexed from a plurality of the transmission packet streams generated from the transmission packet stream generating unit, a transmission packet stream multiplexing unit synthesizing a plurality of the transmission packet streams selected by the digital switching unit into the single synthesized transmission packet stream, a memory storing the synthesized transmission packet stream of the transmission packet stream multiplexing unit, a transmission packet stream processing unit judging whether the synthesized transmission packet stream stored in the memory exceeds a previously set amount or not, a wireless transmitting/receiving unit reading the synthesized transmission packet stream stored in the memory if the synthesized transmission packet stream stored in the memory exceeds the previously set amount, the wireless transmitting/receiving unit modulating the read synthesized transmission packet stream into a radio frequency signal to transmit by wireless, and a central processing unit controlling operations of the respective units.

More preferably, the transmission packet stream generating unit includes a digital broadcast signal receiving unit receiving a digital broadcast signal from an external antenna to transform into a transmission packet stream form to output, a digital video/audio signal receiving unit receiving digital video/audio signals as a transmission packet stream from the external digital equipment, a plurality of analog signal receiving units receiving analog video/audio signals from the external analog equipments, and an MPEG encoder transforming the analog video/audio signals outputted from the analog signal receiving units into the transmission packet stream from.

Preferably, the display apparatus includes a wireless transmitting/receiving unit receiving the synthesized transmission packet stream transmitted by wireless from the stream source apparatus, a memory storing the synthesized transmission packet stream received from the wireless transmitting/receiving unit, a transmission packet stream processing unit judging whether the synthesized transmission packet stream stored in the memory exceeds a previously set amount or not, a PIP processing unit, if the transmission packet stream processing unit judges that the synthesized transmission packet stream stored in the memory 240 exceeds the previously set amount, reading to separate the synthesized transmission packet stream stored in the memory, the PIP processing unit processing the separated transmission packet stream by PIP, and a central processing unit receiving the synthesized transmission packet stream to control operations of the respective units.

In another aspect of the present invention, a stream source apparatus includes a transmission packet stream generating unit receiving analog/digital signals from external analog/digital equipments to generate a plurality of transmission packet streams corresponding to the analog/digital signals, a digital switching unit selecting a plurality of the transmission packet streams to be multiplexed from a plurality of the transmission packet streams generated from the transmission packet stream generating unit, a transmission packet stream multiplexing unit synthesizing a plurality of the transmission packet streams selected by the digital switching unit into a single synthesized transmission packet stream, a memory storing the synthesized transmission packet stream of the transmission packet stream multiplexing unit, a transmission packet stream processing unit judging whether the synthesized transmission packet stream stored in the memory exceeds a previously set amount or not, a wireless transmitting/receiving unit reading the synthesized transmission packet stream stored in the memory if the synthesized transmission packet stream stored in the memory exceeds the previously set amount, the wireless transmitting/receiving unit modulating the read synthesized transmission packet stream into a radio frequency signal to transmit by wireless, and a central processing unit controlling operations of the respective units.

In a further aspect of the present invention, a display apparatus includes a wireless transmitting/receiving unit receiving a synthesized transmission packet stream transmitted by wireless from a stream source apparatus, a memory receiving to store the synthesized transmission packet stream therein, a transmission packet stream processing unit judging whether the synthesized transmission packet stream stored in the memory exceeds a previously set amount or not, a PIP processing unit, if the transmission packet stream processing unit judges that the synthesized transmission packet stream stored in the memory exceeds the previously set amount, reading to separate the synthesized transmission packet stream stored in the memory, the PIP processing unit processing the separated transmission packet stream by PIP, and a central processing unit receiving the synthesized transmission packet stream to control operations of the respective units.

In another further aspect of the present invention, an interfacing method for stream source apparatus and display apparatus includes a judging step of judging whether a remote control signal inputted to a display apparatus in accordance with a user's operation of a remote controller is a signal for controlling an operation of the stream source apparatus or the display device, a performing step of having the display device carry out a corresponding operation according to the inputted remote control signal if the judging step judges that the remote control signal is the signal for controlling the display apparatus, a transmitting step of having the display apparatus transmit the inputted remote control signal by wireless to the stream source apparatus if the judging step judges that the remote control signal is the signal of controlling the stream source apparatus, and a step of having the stream source apparatus receive the transmitted remote control signal and multiplexing a plurality of transmission packet streams into a single synthesized transmission packet stream according to the remote control signal to transmit to the display apparatus by wireless.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings.

Figure 1:
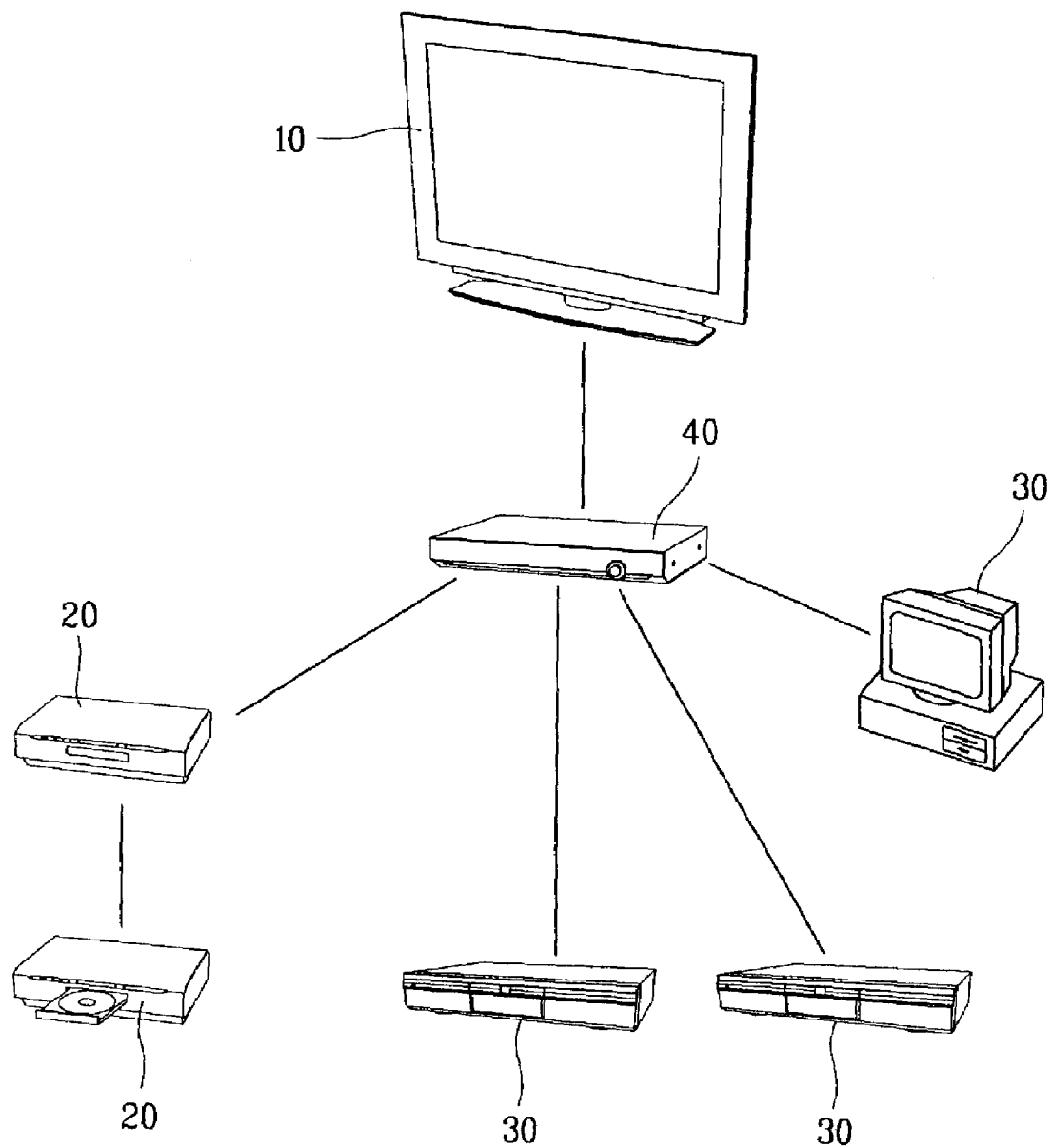
FIG. 1 illustrates a diagram of an interfacing system for stream source device and display device according to a related art.
Figure 2:
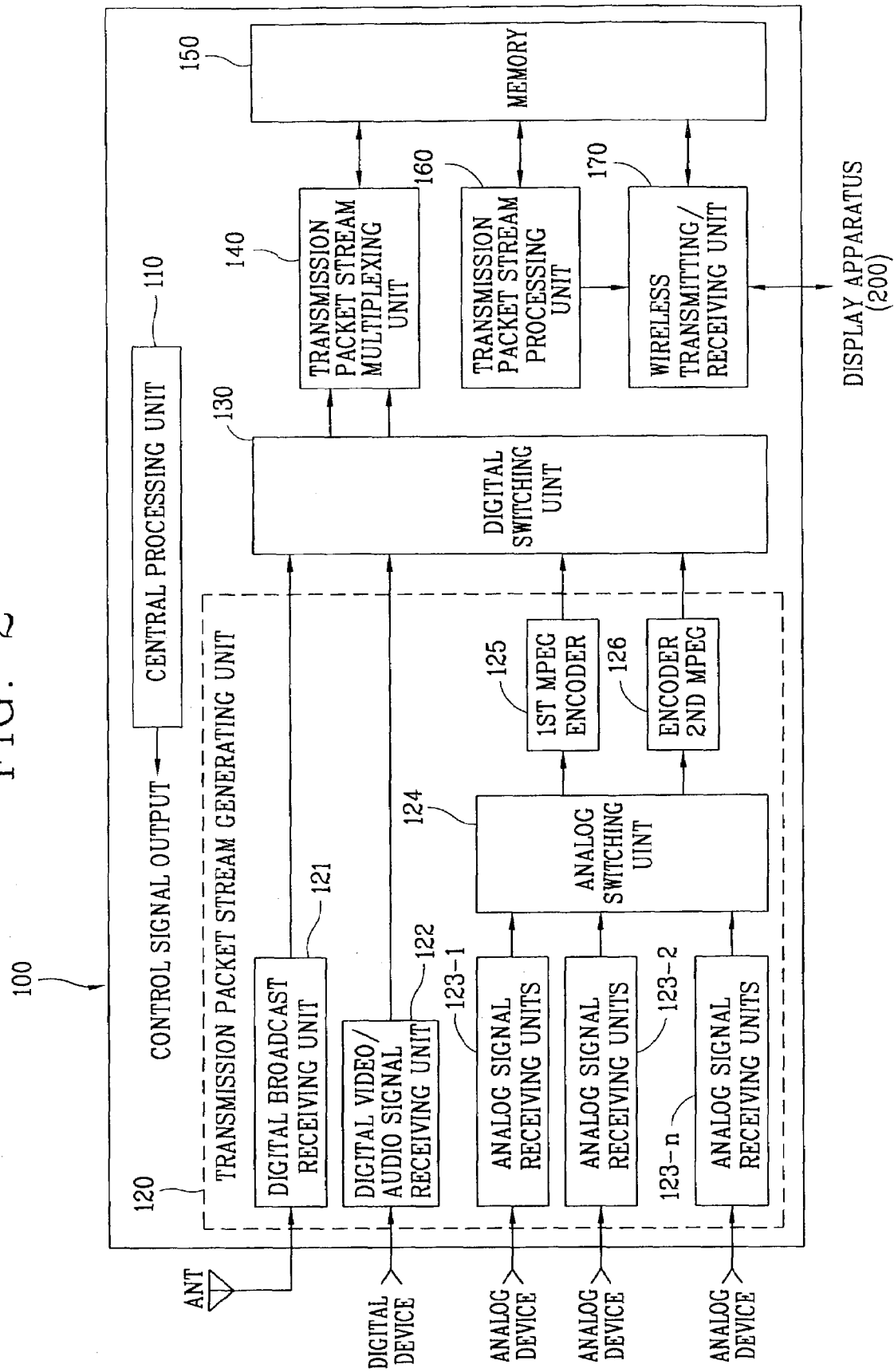
FIG. 2 illustrates a block diagram of a stream source apparatus according to the present invention.

FIG. 2 illustrates a block diagram of a stream source apparatus 100 according to the present invention.

Referring to FIG. 2, a stream source apparatus 100 according to the present invention includes a central processing unit 110 controlling a series of operation for transmitting a plurality of transmission packet streams corresponding to various video/audio signals to a display apparatus 200 that will be explained later, the central processing unit 110 controlling the stream source apparatus 100 according to a remote control signal, which is received from the display apparatus 200, by an operation of a remote controller and simultaneously generating a response signal corresponding to the received remote control signal to transmit to the display apparatus 200 by wireless, a transmission packet stream generating unit 120 generating a plurality of transmission packet streams corresponding to a plurality of the inputted video/audio signals, a digital switching unit 130 selecting to output a plurality of the transmission packet streams, which will be multiplexed, by switching a plurality of the transmission packet streams generated from the transmission packet stream generating unit 120, a transmission packet stream multiplexing unit 140 synthesizing a plurality of the transmission packet streams outputted from the digital switching unit 130 to transform into a single transmission packet stream form, a memory 150 storing the synthesized packet stream transformed by the transmission packet stream multiplexing unit 140, a transmission packet stream processing unit 160 checking whether the transmission packet streams exceeding a previously set amount are stored in the memory 150 or not and generating a transmission message if the transmission packet streams exceeding the previously set amount are stored in the memory 150, and a wireless transmitting/receiving unit 170 reading to transform the synthesized transmission packet stream stored in the memory 150 into a radio frequency signal when the transmission message is generated from the transmission packet stream processing unit 160, the wireless transmitting/receiving unit 170 transmitting the radio frequency signal to the display apparatus 200 by wireless or transmitting/receiving the remote control signal according to the user's operation of the remote controller and the response signal corresponding to the control signal to/from the display apparatus 200 by wireless.

In this case, the transmission packet stream generating unit 120 includes a digital broadcast receiving unit 121 having an ATSC(advanced television systems committee) tuner, a VSB(vestigial side band) chip, and the like to receive a digital broad cast signal of a predetermined channel through an external antenna ANT, the digital broadcast receiving unit 121 transforming the received digital broadcast signal into a transmission packet stream form to output, a digital signal receiving unit 122 receiving to output a transmission packet stream corresponding to digital video/audio signals from an external digital equipment, a plurality of analog signal receiving units 123-1, 123-2, . . . , and 123-n receiving analog video/audio signals from a plurality of external analog equipments to output, an analog switching unit 124 switching a plurality of the analog video/audio signals outputted from a plurality of the analog signal receiving units 125 according to a control of the central processing unit 110 to select two of the analog video/audio signals, and first and second MPEG encoders 125 and 126 encoding the two analog video/audio signals selected by the analog switching unit 124 by moving picture expert group (hereinafter abbreviated MPEG), respectively to transform into the transmission packet stream form.

The respective units inside the transmission packet stream generating unit 120, the digital switching unit 130, the transmission packet stream multiplexing unit 140, the memory 150, the transmission packet stream processing unit 160, and the wireless transmitting/receiving unit 170 are connected to a control bus (not shown in the drawing) to carry out a predetermined operation in accordance with the control of the central processing unit 110.

Figure 3:
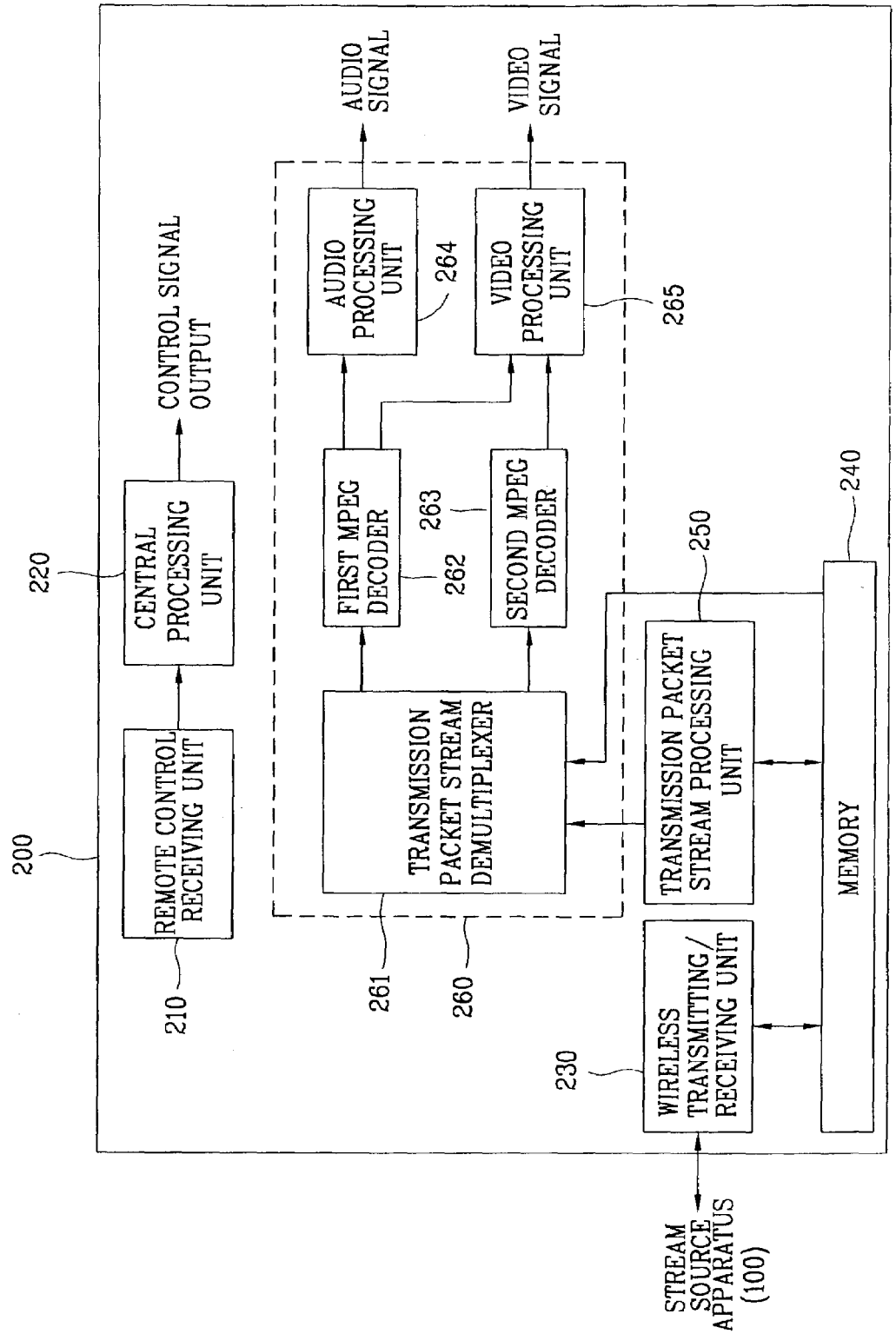
FIG. 3 illustrates a block diagram of a display apparatus according to the present invention.

FIG. 3 illustrates a block diagram of a display apparatus according to the present invention.

Referring to FIG. 3, a display apparatus 200 according to the present invention includes a remote control receiving unit 210 receiving a remote control signal according to a user's operation, a central processing unit 220 controlling a series of operation of receiving to PIP-process the synthesized transmission packet stream transmitted by wireless from the stream source apparatus 100 and simultaneously judging the remote control signal received by the remote control receiving unit 210, the central processing unit 220 transmitting the remote control signal to the stream source apparatus 100 by wireless if the remote control signal is a signal for controlling an operation of the stream source apparatus 100 or controlling the display apparatus 200 to carry out a corresponding operation according to the remote control signal if the remote control signal is a signal for controlling an operation of the display apparatus 200, a wireless transmitting/receiving unit 230 receiving the synthesized transmission packet stream and the response signal corresponding to the remote control signal transmitted by wireless from the stream source apparatus 100 and transmitting the remote control signal outputted from the central processing unit 220 to the stream source apparatus 100 by wireless, a memory 240 storing the synthesized transmission packet stream received from the wireless transmitting/receiving unit 230, a transmission packet stream processing unit 250 checking whether the synthesized transmission packet stream exceeding a previously set amount is stored in the memory 240 or not, the transmission packet stream processing unit 250 generating a transmission message if the synthesized transmission packet stream exceeding the previously set amount is stored in the memory 240, and a PIP processing unit 260 reading the synthesized transmission packet stream stored in the memory 240 to carry out a PIP processing if the transmission message is generated from the transmission packet stream processing unit 250.

The PIP processing unit 260 includes a transmission packet stream demultiplexer 261 reading the synthesized transmission packet stream from the memory 240 to separate into transmission packet streams corresponding to a main screen and a sub-screen respectively when the transmission message is generated from the transmission packet stream processing unit 250, a first MPEG decoder 262 generating a digital video signal and a digital audio signal by decoding the transmission packet stream corresponding to the main screen separated by the transmission packet stream demultiplexer 261, a second MPEG decoder 263 generating a digital video signal by decoding the transmission packet stream corresponding to the sub-screen separated by the transmission packet stream demultiplexer 261, an audio processing unit 264 processing the digital audio signal of the main screen generated from the first MPEG decoder 262 to output to a speaker or the like, and a video processing unit 265 carrying out the PIP processing on the digital video signals of the main screen and the sub-screen generated respectively from the first and second MPEG decoders 262 and 263 to display a PIP image on a display screen.

In this case, the wireless transmitting/receiving unit 230 of the display apparatus 200, the memory 240, the transmission packet stream processing unit 250, and the respective units inside the PIP processing unit 260 ar3 connected to the control bus to carry out a predetermined operation according to the control of the central processing unit 220.

An interfacing system for stream source apparatus and display apparatus and an interfacing method thereof according to the present invention are explained in detail by referring to the attached drawings of FIG. 2 and FIG. 3 as follows.

First of all, by the control of the central processing unit 110, the digital broadcast receiving unit 121 of the transmission packet stream generating unit 120 receives the digital broadcast signal of a predetermined channel from the external antenna ANT using the built-in ATSC tuner, and then the built-in VSB chip or the like transforms the received digital broadcast signal into the transmission packet stream form to output to the digital switching unit 130.

Moreover, the digital video/audio signal receiving unit 122 of the transmission packet stream generating unit 120 receives the transmission packet stream corresponding to the digital video/audio signals transmitted from the external digital equipment and then outputs the received transmission packet stream to the digital switching unit 130.

Meanwhile, a plurality of the analog video/audio signal receiving units 123 of the transmission packet stream generating unit 120 receives a plurality of the analog video/audio signals transmitted from a plurality of the external analog equipments, respectively and the received analog video/audio signals are then inputted to the analog switching unit 124.

Subsequently, the analog switching unit 124 switches to output two of a plurality of the inputted analog video/audio signals selected by the control of the central processing unit 110, and the outputted two analog video/audio signals are then transformed into digital video/audio signals by the first and second MPEG encoders 125 and 126, respectively. The digital video/audio signals are compressed into the transmission packet stream to input to the digital switching unit 130.

The digital switching unit 130 switches the two transmission packet streams selected by the control of the central processing unit 110 from a plurality of the transmission packet streams inputted respectively from the digital broadcast signal receiving unit 121, the digital video/audio signal receiving unit 122, and the first and second MPEG encoders 125 and 126, and then outputs the switched transmission packet streams.

In other words, in accordance with the control of the central processing unit 110, the digital switching unit 130 selects to output the transmission packet streams corresponding to the main screen and the sub-screen respectively among a plurality of the transmission packet streams inputted from the first and second MPEG encoders 125 and 126.

The transmission packet streams corresponding to the main screen and the sub-screen respectively are then inputted to the transmission packet stream multiplexing unit 140.

The transmission packet stream multiplexing unit 140 synthesizes the transmission packet streams corresponding to the main screen and the sub-screen to transform into the single synthesized transmission packet stream form, and then stores the transformed synthesized transmission packet stream in the memory 150.

In this case, when the transmission packet stream multiplexing unit 140 receives to separate the synthesized transmission packet stream transformed into the transmission packet stream form, it should be clearly distinguished whether the synthesized transmission packet stream is a stream corresponding to the main screen or the sub-screen. Hence, for the purpose of the distinct, a stream type guide field including a guide information is inserted in a header of the synthesized transmission packet stream.

Subsequently, the transmission packet stream processing unit 160 keeps monitoring an amount of the synthesized transmission packet stream stored in the memory. If the amount of the synthesized transmission packet stream stored in the memory 150 exceeds a previously set amount, the transmission packet stream processing unit 160 generates to output the transmission message 170 to the wireless transmitting/receiving unit 170.

The wireless transmitting/receiving unit 170 reads the synthesized transmission packet stream stored in the memory 150 in accordance with the transmission message, modulates the read synthesized transmission packet stream into a radio frequency signal, and then transmits the radio frequency signal to the display apparatus 200 by wireless.

And, the wireless transmitting/receiving unit 130 of the display unit 200 receives the synthesized transmission packet stream transmitted by wireless from the wireless transmitting/receiving unit 170 of the stream source apparatus 100 to store in the memory 240.

The transmission packet stream processing unit 250 keeps monitoring an amount of the synthesized transmission packet stream stored in the memory 240. If the amount of the synthesized transmission packet stream exceeds a previously set amount, the transmission packet stream processing unit 250 generates a transmission message to output to the transmission packet stream demultiplexer 261 of the PIP processing unit 260.

Then, the transmission packet stream demultiplexer 261 reads the synthesized transmission packet stream stored in the memory 240 in accordance with the transmission message inputted from the transmission packet stream processing unit 250, and separates the read synthesized transmission packet stream into the transmission packet stream corresponding to the main screen and the transmission packet stream corresponding to the sub-screen.

In this case, the transmission packet stream demultiplexer 261, as mentioned in the forgoing description, uses the stream type guide information inserted in the header of the synthesized transmission packet stream to separate the read synthesized transmission packet stream into the transmission packet streams corresponding to the main screen and the sub-screen respectively.

The first MPEG decoder 262 decodes the separated transmission packet stream corresponding to the main screen by MPEG, and then outputs the digital video and audio signals according to the MPEG-decoded transmission packet stream. And, the second MPEG decoder 263 decodes the separated transmission packet stream corresponding to the sub-screen by MPEG, and then outputs the digital video signal according to the MPEG-decoded transmission packet stream.

The digital audio signal, which is outputted from the first MPEG decoder 262 and corresponds to the main screen, is processed by the audio processing unit 264, and is then outputted to a speaker (not shown in the drawing) or the like.

The digital video signals, which are outputted from the first and second MPEG decoders 262 and 263 and correspond to the main screen and the sub-screen, respectively, are inputted to the video processing unit 265, are synthesized into the PIP form, and are then displayed on the screen. Hence, a user enables to watch two kinds of images by PIP.

Meanwhile, once the user presses a predetermined key of a remote control transmitter (not shown in the drawing) such as a remote controller or the like to control the operation of the stream source apparatus 100 or the display apparatus 200, the remote control transmitter generates to transmit a pre3determined remote control signal.

The remote control receiving unit 210 receives the transmitted remote control signal to input to the central processing unit 220.

Figure 4:
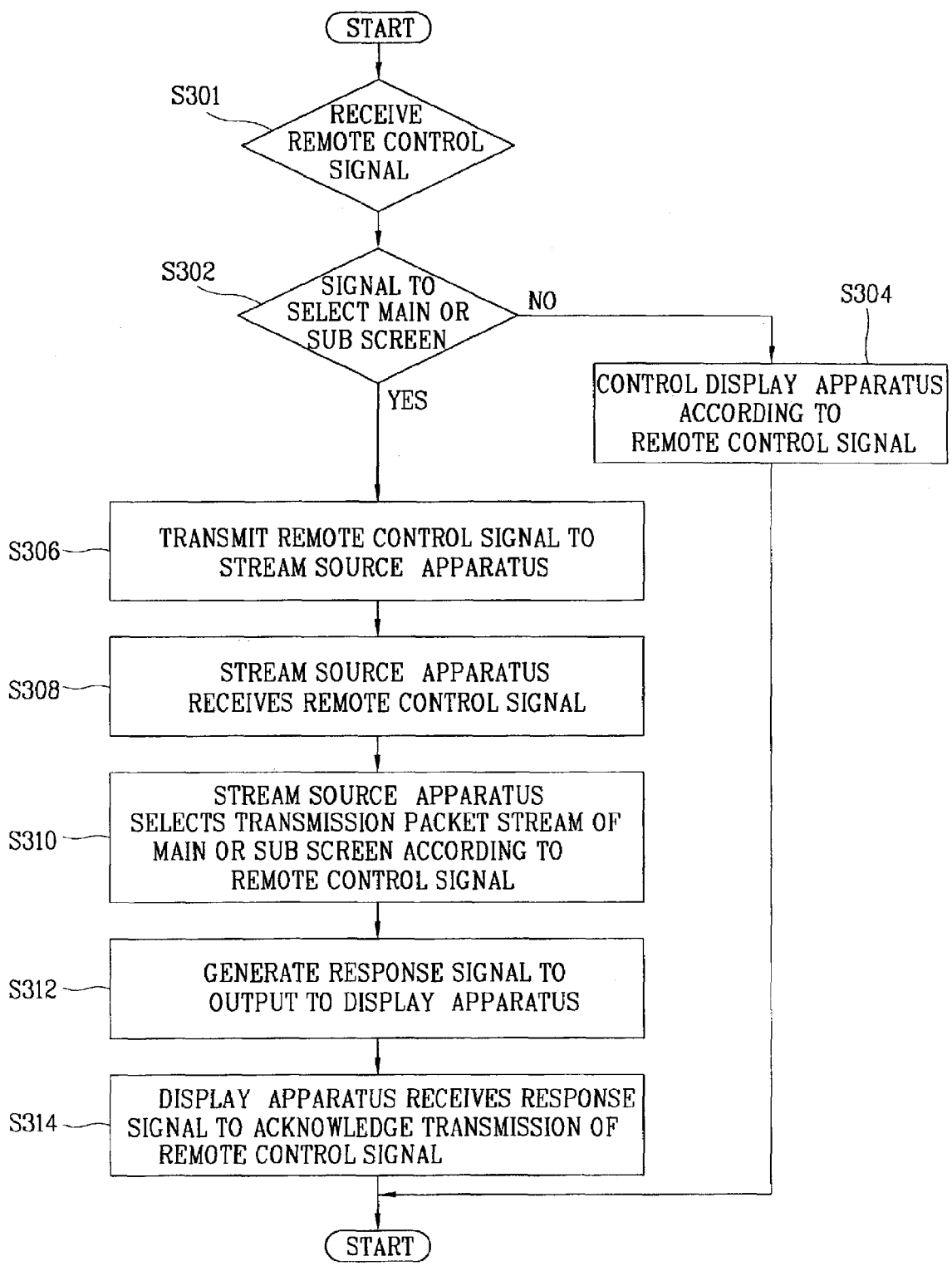
FIG. 4 illustrates a signal flowchart of an interfacing method according to the present invention.

Thereafter, the central processing unit 220 receives the remote control signal received from the remote control receiving unit 210 to carry out a predetermined user-demanding control operation, which is explained in FIG. 4.

FIG. 4 illustrates a signal flowchart of operating a central processing unit built in a display apparatus according to the present invention.

Referring to FIG. 4, a method of operating a central processing unit includes a judging step of judging whether a remote control signal inputted to a display device in accordance with a user's operation of a remote controller is a signal of controlling an operation of a stream source apparatus or the display apparatus, a performing step of having the display apparatus carry out a corresponding operation according to the inputted remote control signal if the judging step judges that the remote control signal is the signal of controlling the operation of the display apparatus, a transmitting step of having the display apparatus transmit the remote control signal by wireless to the stream source apparatus if the judging step judges that the remote control signal is the signal of controlling the operation of the stream source apparatus, and a step of having the stream source apparatus receive the transmitted remote control signal and multiplexing a plurality of transmission packet streams into a single synthesized transmission packet stream according to the remote control signal to transmit to the display apparatus by wireless.

A method of operating a central processing unit built in a display apparatus according to the present invention is explained in detail by referring to the attached drawings as follows.

First of all, a central processing unit 220 judges an input of a corresponding remote control signal according to a user's operation of a remote controller (S300), and judges whether the inputted remote control signal is a signal of controlling an operation of a stream source apparatus 100 or not (S302). In other words, the central processing unit 220 judges whether the remote control signal is the signal for selecting a transmission packet stream corresponding to a main screen or a sub-screen.

As a result of the judgment step S302, if the remote control signal is not the signal of controlling the operation of the stream source apparatus 100 but the signal of controlling the operation of the display apparatus 200, the central processing unit 220 controls operation of the respective units of the display apparatus 200 to carry out a user-demanding operation (S304).

In this case, a PIP processing unit of the display apparatus 200 is controlled through the remote control signal according to the user's operation of the remote controller, whereby a user enables to switch the main screen and the sub-screen to each other to watch.

Meanwhile, as a result of the judgment step S302, if the remote control signal is the signal of controlling the operation of the stream source apparatus 100, the central processing unit 220 transmits the remote control signal to the stream source apparatus 100 by wireless through a wireless transmitting/receiving unit 230 (S306).

A wireless transmitting/receiving unit 170 of the stream source apparatus 100 receives the transmitted remote control signal, and then inputs the received remote control signal to the central processing unit 110.

Thereafter, the central processing unit 110 controls a digital switching unit 130 according to the received remote control signal to select the transmission packet stream corresponding to the main screen and the transmission packet stream corresponding to the sub-screen (S310).

In this case, through the remote control signal according to the user's operation of the remote controller, the digital switching unit 130 receives transmission packet streams from a digital broadcast signal receiving unit 121, a digital video/audio signal receiving unit 122, and at least one of analog video/audio signal receiving units 121-1, 121-2, . . . , and 121-n to transform into a single synthesized transmission packet stream, and then outputs the synthesized transmission packet stream to a transmission packet stream multiplexing unit to carry out the operation in FIG. 2.

In this case, the remote control signal generated according to the user's operation of the remote controller includes a channel switching signal for switching a channel of the stream source apparatus 100, a volume control signal for adjusting a volume of the stream source apparatus 100, an on/off signal for turning on/off a power of the stream source apparatus 100, and the like. Hence, the user enables to control both of the stream source apparatus and display apparatus 100 and 200 using a single remote controller.

As mentioned in the foregoing description, the remote control signal generated according to the remote controller operation includes various control signals for performing functions used in a general remote controller as well as the channel switching, volume control, and on/off signals, thereby enabling to carry out the various functions according to the various control signals.

Subsequently, the central processing unit 110 generates a response signal according to a reception of the remote control signal, i.e. a signal for informing that the remote control signal is normally received to carry out the corresponding operation, and then transmits the generated response signal to the stream source apparatus 200 by wireless through the wireless transmitting/receiving unit 140 (S312).

A wireless transmitting/receiving unit 230 of the display apparatus 200 receives the transmitted response signal to output to the central processing unit 220. Through the inputted response signal, the central processing unit 220 confirms that the remote control signal is normally transmitted to the stream source apparatus 100 to carry out the user-demanding predetermined operation (S314).

Thereafter, a series of operation of the central processing unit 220 for carrying out the user-demanding predetermined control operation by receiving the received remote control signal from the remote control receiving unit 210 is ended.

In the foregoing description of the present invention, for example, the stream source apparatus 100 multiplexes at least two of the transmission packet streams into the single synthesized transmission packet stream to transmit to the display apparatus 200. Yet, the stream source apparatus 100 synthesizes a plurality of the transmission packet streams into a single synthesized transmission packet stream to transmit to the display apparatus 200 by wireless, thereby enabling to display a plurality of video signals by PIP. Instead, the present invention includes at least two of the first and second MPEG decoders 125 and 126 to decode a plurality of analog video/audio signals by MPEG.

Accordingly, the present invention has the stream source apparatus multiplex a plurality of the transmission packet streams to transmit by wireless and has the display device receive a plurality of the transmitted transmission packet streams, thereby enabling the user to watch a plurality of the video signals by PIP.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An interfacing system for a stream source apparatus and a display device, comprising:
   a stream source apparatus receiving analog/digital signals from external analog/digital equipments to generate a plurality of transmission packet streams corresponding to the analog/digital signals, the stream source apparatus synthesizing a plurality of the transmission packet streams into a single synthesized transmission packet stream to transmit the synthesized transmission packet stream by wireless; and
   a display apparatus receiving the synthesized transmission packet stream transmitted from the stream source apparatus, the display apparatus separating the synthesized transmission packet stream into a transmission packet stream corresponding to a main screen and a transmission packet stream corresponding to a sub-screen, the display apparatus decoding the transmission packet streams corresponding to the main screen and the sub-screen respectively to generate digital video/audio signals to display on a display screen by a PIP form.

2. The interfacing system of claim 1, the stream source apparatus comprising:
   a transmission packet stream generating unit receiving the analog/digital signals from the external analog/digital equipments to generate a plurality of the transmission packet streams;
   a digital switching unit selecting a plurality of the transmission packet streams to be multiplexed from a plurality of the transmission packet streams generated from the transmission packet stream generating unit;
   a transmission packet stream multiplexing unit synthesizing a plurality of the transmission packet streams selected by the digital switching unit into the single synthesized transmission packet stream;
   a memory storing the synthesized transmission packet stream of the transmission packet stream multiplexing unit;
   a transmission packet stream processing unit judging whether the synthesized transmission packet stream stored in the memory exceeds a previously set amount or not;
   a wireless transmitting/receiving unit reading the synthesized transmission packet stream stored in the memory if the synthesized transmission packet stream stored in the memory exceeds the previously set amount, the wireless transmitting/receiving unit modulating the read synthesized transmission packet stream into a radio frequency signal to transmit by wireless; and
a central processing unit controlling operations of the respective units.

3. The interfacing system of claim 2, the transmission packet stream generating unit comprising:
a digital broadcast signal receiving unit receiving a digital broadcast signal from an external antenna to transform into a transmission packet stream form to output;
a digital video/audio signal receiving unit receiving digital video/audio signals as a transmission packet stream from the external digital equipment;
a plurality of analog signal receiving units receiving analog video/audio signals from the external analog equipments; and
an MPEG encoder transforming the analog video/audio signals outputted from the analog signal receiving units into the transmission packet stream form.

4. The interfacing system of claim 2, wherein the transmission packet stream multiplexing unit distinguishes whether the synthesized transmission packet stream corresponds to the main screen or the sub-screen using a stream type guide field inserted in a header of the synthesized transmission packet stream.

5. The interfacing system of claim 2, wherein the wireless transmitting/receiving unit receives a remote control signal transmitted by wireless according to a user's operation of a remote controller and outputs the received remote control signal to the central processing unit to carry out a user-demanding predetermined operation.

6. The interfacing system of claim 2, wherein, if a remote control signal according to a user's operation of a remote controller is a signal for controlling the stream source apparatus, the wireless transmitting/receiving unit receives the remote control signal and receives a response signal corresponding to the remote control signal transmitted from the central processing unit to transmit by wireless.

7. The interfacing system of claim 1, the display apparatus comprising:
a wireless transmitting/receiving unit receiving the synthesized transmission packet stream transmitted by wireless from the stream source apparatus;
a memory storing the synthesized transmission packet stream received from the wireless transmitting/receiving unit;
a transmission packet stream processing unit judging whether the synthesized transmission packet stream stored in the memory exceeds a previously set amount or not;
a PIP processing unit, if the transmission packet stream processing unit judges that the synthesized transmission packet stream stored in the memory exceeds the previously set amount, reading to separate the synthesized transmission packet stream stored in the memory, the PIP processing unit processing the separated transmission packet stream by PIP; and
a central processing unit receiving the synthesized transmission packet stream to control operations of the respective units.

8. The interfacing system of claim 7, the PIP processing unit comprising:
a transmission packet stream demultiplexer, if the transmission packet stream processing unit judges that the synthesized transmission packet stream stored in the memory exceeds the previously set amount, reading the synthesized transmission packet stream stored in the memory to separate into a plurality of the transmission packet streams;
a first MPEG decoder decoding a plurality of the transmission packet streams separated by the transmission packet stream demultiplexer by MPEG to transform into the digital video/audio signals corresponding to the main screen to output;
a second MPEG decoder decoding a plurality of the transmission packet streams separated by the transmission packet stream demultiplexer by MPEG to transform into the digital video signal corresponding to the sub-screen to output;
an audio processing unit processing the digital audio signal corresponding to the main screen outputted from the first MPEG decoder to output to a speaker; and
a video processing unit carrying out a PIP processing on the digital video signals corresponding to the main screen and the sub-screen respectively outputted from the first and second MPEG decoders to display on a display screen.

9. The interfacing system of claim 8, wherein the transmission packet stream demultiplexer separates the synthesized transmission packet stream using a guide information stored in a stream type guide field of a header of the synthesized transmission packet stream.

10. A stream source apparatus comprising:
a transmission packet stream generating unit receiving analog/digital signals from external analog/digital equipments to generate a plurality of transmission packet streams corresponding to the analog/digital signals;
a digital switching unit selecting a plurality of the transmission packet streams to be multiplexed from a plurality of the transmission packet streams generated from the transmission packet stream generating unit;
a transmission packet stream multiplexing unit synthesizing a plurality of the transmission packet streams selected by the digital switching unit into a single synthesized transmission packet stream;
a memory storing the synthesized transmission packet stream of the transmission packet stream multiplexing unit;
a transmission packet stream processing unit judging whether the synthesized transmission packet stream stored in the memory exceeds a previously set amount or not;
a wireless transmitting/receiving unit reading the synthesized transmission packet stream stored in the memory if the synthesized transmission packet stream stored in the memory exceeds the previously set amount, the wireless transmitting/receiving unit modulating the read synthesized transmission packet stream into a radio frequency signal to transmit by wireless; and
a central processing unit controlling operations of the respective units.

11. The stream source apparatus of claim 10, the transmission packet stream generating unit comprising:
a digital broadcast signal receiving unit receiving a digital broadcast signal from an external antenna to transform into a transmission packet stream form to output;
a digital video/audio signal receiving unit receiving digital video/audio signals as a transmission packet stream from the external digital equipment;
a plurality of analog signal receiving units receiving analog video/audio signals from the external analog equipments; and an MPEG encoder transforming the analog video/audio signals outputted from the analog signal receiving units into the transmission packet stream from.

12. The stream source apparatus of claim 10, wherein the transmission packet stream multiplexing unit distinguishes whether the synthesized transmission packet stream corresponds to the main screen or the sub-screen using a stream type guide field inserted in a header of the synthesized transmission packet stream.

13. A display apparatus comprising:
a wireless transmitting/receiving unit receiving a synthesized transmission packet stream transmitted by wireless from a stream source apparatus;
a memory receiving to store the synthesized transmission packet stream therein;
a transmission packet stream processing unit judging whether the synthesized transmission packet stream stored in the memory exceeds a previously set amount or not;
a PIP processing unit, if the transmission packet stream processing unit judges that the synthesized transmission packet stream stored in the memory exceeds the previously set amount, reading to separate the synthesized transmission packet stream stored in the memory, the PIP processing unit processing the separated transmission packet stream by PIP; and
a central processing unit receiving the synthesized transmission packet stream to control operations of the respective units.

14. The display apparatus of claim 13, the PIP processing unit comprising:
a transmission packet stream demultiplexer, if the transmission packet stream processing unit judges that the synthesized transmission packet stream stored in the memory exceeds the previously set amount, reading the synthesized transmission packet stream stored in the memory to separate into a plurality of transmission packet streams;
a first MPEG decoder decoding a plurality of the transmission packet streams separated by the transmission packet stream demultiplexer by MPEG to transform into digital video/audio signals corresponding to a main screen to output;
a second MPEG decoder decoding a plurality of the transmission packet streams separated by the transmission packet stream demultiplexer by MPEG to transform into a digital video signal corresponding to a sub-screen to output;
an audio processing unit processing the digital audio signal corresponding to the main screen outputted from the first MPEG decoder to output to a speaker; and
a video processing unit carrying out a PIP processing on the digital video signals corresponding to the main screen and the sub-screen respectively outputted from the first and second MPEG decoders to display on a display screen.

15. The display apparatus of claim 14, wherein the transmission packet stream demultiplexer separates the synthesized transmission packet stream using a guide information stored in a stream type guide field of a header of the synthesized transmission packet stream.

16. An interfacing method for stream source apparatus and display apparatus, comprising:
a judging step of judging whether a remote control signal inputted to a display apparatus in accordance with a user's operation of a remote controller is a signal for controlling an operation of the stream source apparatus or the display apparatus;
a performing step of having the display apparatus carry out a corresponding operation according to the inputted remote control signal if the judging step judges that the remote control signal is the signal for controlling the display apparatus;
a transmitting step of having the display apparatus transmit the inputted remote control signal by wireless to the stream source apparatus if the judging step judges that the remote control signal is the signal of controlling the stream source apparatus; and
a step of having the stream source apparatus receive the transmitted remote control signal and multiplexing a plurality of transmission packet streams into a single synthesized transmission packet stream according to the remote control signal to transmit to the display apparatus by wireless.

17. The method of claim 16, further comprising a step of, after an operation according to the received remote control signal is carried out, generating a response signal for acknowledging a reception of the remote control signal and informing that the operation according to the remote control signal is carried out and transmitting the response signal to the display apparatus by wireless.

* * * * *